March 15, 1966     H. SHORE     3,239,977
WALL CONSTRUCTION AND MOISTURE BARRIER
Filed March 5, 1964
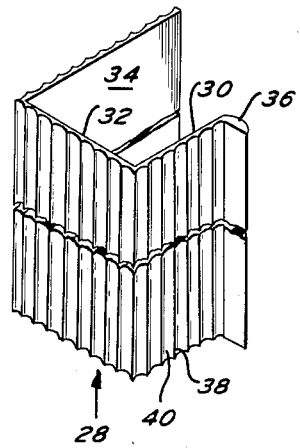
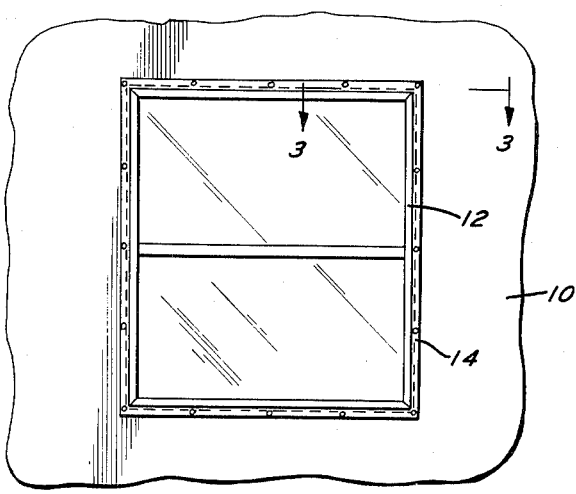
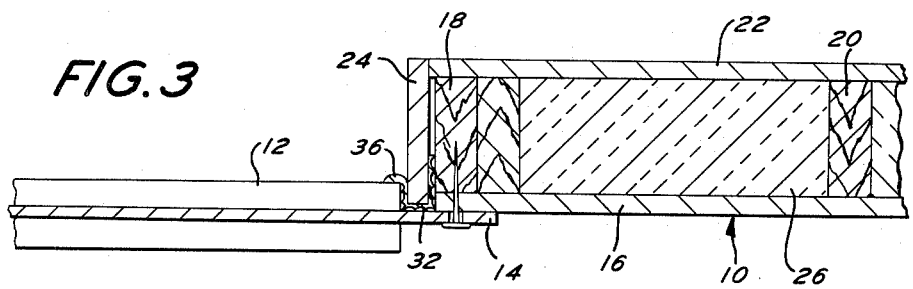
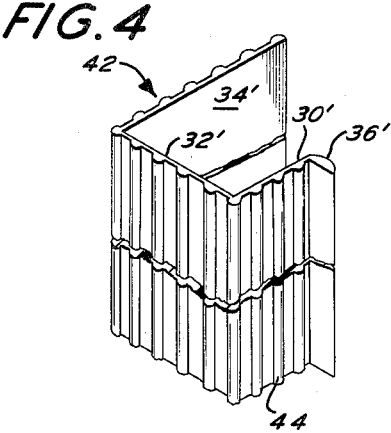
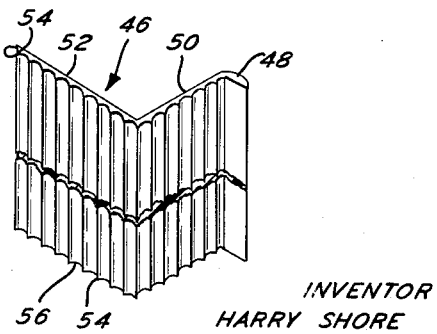
INVENTOR
HARRY SHORE
BY Arthur H. Seidel
ATTORNEY United States Patent Office 3,239,977
Patented Mar. 15, 1966

3,239,977
WALL CONSTRUCTION AND MOISTURE
BARRIER
Harry Shore, 2073 S. John Russell Circle,
Elkins Park 17, Pa.
Filed Mar. 5, 1964, Ser. No. 349,576
2 Claims. (Cl. 52—204)

This invention relates to a wall construction and moisture barrier. The wall construction is particularly of the type using dry wall sheathing and metallic constructional elements such as metallic window frames juxtaposed to a portion thereof. Between such juxtaposed portions, a moisture barrier is provided in accordance with the present invention.

Heretofore, the use of dry wall sheathing has become prevalent in the construction industry. Such dry wall sheathing is a fibrous material which has been placed in contact with one or more metallic surfaces on window frames and the like. During changes in weather, the window frames sweat and/or moisture collects thereon which is absorbed by the dry wall. Such absorption of the moisture results in rapid deterioration of the dry wall sheathing. Such deterioration is unsightly, difficult and expensive to replace.

A moisture barrier in accordance with the present invention has at least two legs which are substantially perpendicular to each other and made from a water impervious polymeric material such as polyethylene. A lip is integral with the terminal portion of one of said legs. On the outer surface of said legs, there are provided deformable projections. Such projections will be deformed when installing the dry wall sheathing by contact with juxtaposed surfaces on the metallic window frame or the like. Accordingly, there will be provided a plurality of parallel capillary passages whereby moisture will be conducted by gravity to a position wherein it may be safely discharged or absorbed. The barrier prevents such moisture from being absorbed by the dry wall.

The moisture barrier of the present invention lends itself to mass production by extruding the barrier on a continuous basis with subsequent cutting to required lengths. The moisture barrier in accordance with one embodiment of the present invention is provided with three legs which have internal transverse dimensions corresponding to the thickness of the dry wall sheathing. Hence, the moisture barrier may be preassembled by force-fitting the same onto an end of the dry wall sheating.

It is an object of the present invention to provide a novel moisture barrier.

It is another object of the present invention to provide a moisture barrier adapted to be interposed between dry wall sheathing and a metallic frame.

It is another object of the present invention to provide a moisture barrier which is water impervious, flexible, easy to cut, inexpensive, and capable of being transparent or translucent.

It is another object of the present invention to provide a wall construction having dry wall sheathing juxtaposed to a metallic frame with a water impervious barrier disposed therebetween to prevent the dry wall sheathing from absorbing moisture condensed on the frame.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a partial perspective view of a moisture barrier in accordance with one embodiment of the present invention.

FIGURE 2 is an elevation view showing a portion of a wall of a building having a window therein.

FIGURE 3 is a sectional view taken along the line 3—3 in FIGURE 2.

FIGURE 4 is a perspective view of a moisture barrier in accordance with another embodiment of the present invention.

FIGURE 5 is a perspective view of a water barrier in accordance with another embodiment of the present invention.

Referring to the drawing in detail, wherein like numerals indicate like elements, there is shown in FIGURE 2 a portion of a wall 10 having a window frame 12 mounted therein. The frame 12 is a metallic window frame and generally is made from aluminum. As is conventional, the window frame 12 has a peripheral flange 14 projecting outwardly therefrom for attachment to a portion of the wall 10.

As shown more clearly in FIGURE 3, the wall 10 includes an outer sheathing 16 which is nailed or otherwise secured to the studs 18 and 20. An inner sheathing 22 of dry wall construction, such as sheet rock material, is nailed, glued or otherwise secured to the studs 18 and 20. A layer of dry wall sheet material 24 is provided alongside of the stud 18 as shown more clearly in FIGURE 3. Layer 24 is likewise secured to the stud 18 in any convenient manner such as by adhesive, nails, etc. Any conventional insulation 26 may be provided between the sheathings 16 and 22.

As shown more clearly in FIGURE 1, there is illustrated a moisture barrier in accordance with one embodiment of the present invention designated generally as 28. The moisture barrier 28 has a first leg 30 and a second leg 32 which are integral and substantially perpendicular to each other. A third leg 34 is integral with leg 32 and extends substantially parallel to leg 30. Leg 34 is preferably longer than leg 30. The terminal portion of leg 30 has integral therewith a lip 36 which is substantially parallel to leg 32.

The moisture barrier 28 is preferably extruded as an integral unit from a water impervious polymeric material which is flexible, easy to cut, inexpensive, and transparent or translucent. Polyethylene is such a material which may be utilized. The thickness of the legs 30–34 may be approximately 0.030 inch. Leg 30 may be approximately three-eighths of an inch long, leg 32 may be approximately one-half inch long, and leg 34 may be approximately three-quarters of an inch long. Other dimensions may be utilized depending upon the thickness of the dry wall construction material and the dimensions of the frame 12 juxtaposed thereto.

The moisture barrier 28 need not be made from a transparent or translucent material. When made from such a material, the lip 36 becomes substantially indistinguishable in the environment in which it is located. The outer surface of the legs 30, 32 and 34 is provided with integral spaced parallel peaks 38 separated by valleys 40. The peaks 38 are adapted to be deformed when assembled as described hereinafter whereby a plurality of capillary channels will be provided in the valleys between adjacent peaks.

In use of the moisture barrier 28, the following sequence of operations may be followed.

The sheathing 16 and dry wall sheathing 22 may be nailed or otherwise secured to the studs 18 and 20. Thereafter, the window frame 12 may be placed in position and permanently mounted therein by nails or screws extending through holes in the flange 14 and into the stud 18. Thereafter, the moisture barrier 28 may be applied to a longitudinal edge portion of the layer 24 of the dry wall sheathing. Preferably, the longitudinal edge portion of the layer 24 is force-fitted between the legs 30 and 34 on the moisture barrier 28. Thereafter, the layer 24 is positioned and secured to the stud 18 as illustrated in FIGURE 3. When positioning the layer 24 and moisture barrier 28 in the position illustrated in FIGURE 3, the peaks 38 will be deformed by contact with the juxtaposed surfaces on the stud 18, flange 14 and frame 12. It will be appreciated that FIGURE 3 is greatly enlarged and is not to scale since the thickness of the legs on the moisture barrier 28 is preferably approximately 0.030 inch.

The deformation of the peaks 38 on the legs 30, 32 and 34 results in the provision of a plurality of capillary channels in the valleys 40. Any condensate from the metal frame 12 or flange 14 will be prevented from contacting the dry wall sheathing and will gravitate to a position below the frame 12. Hence, the layer 24 of the dry wall sheathing will not be subject to such condensate and will be prevented from deteriorating. The lip 36 overlies the inner surface of the frame 12 so as to prevent any moisture on the inner surface of frame 12 from being in a position to bridge across the barrier to the layer 24. Also, the lip 36 provides a neat appearance which otherwise would be unsightly due to the exposed edge of the leg 30 on the barrier 28.

It will be appreciated that FIGURE 3 is a section of one side of the mating surfaces between the frame 12 and the wall 10. Also, it will be appreciated that the barrier 28 will extend around the entire periphery of the frame 12. The moisture barrier 28 may be utilized in other similar environments where dry wall sheathing will be juxtaposed to a metallic member which is subject to having moisture condensed thereon and absorbed by the dry wall sheathing.

In FIGURE 4, there is illustrated a moisture barrier 42 identical with moisture barrier 28 except as will be pointed out hereinafter. Hence, corresponding structure on moisture barrier 42 is provided with primed numerals. In place of the peaks 38 which come to a sharp point, the moisture barrier 42 may be extruded in a manner which provides spaced parallel ribs which are semicircular in cross section. The ribs may be spaced a greater distance apart than the peaks 38.

Thus, the peaks 38 and valleys 40 on the moisture barrier 28 are a continuous sequence of a repetitive pattern. In the moisture barrier 42, a greater distance may be provided between the ribs 44.

In FIGURE 5, there is illustrated another moisture barrier of the present invention designated generally as 46. The moisture barrier 46 is identical with moisture barrier 28 except as will be made clear hereinafter. Thus, moisture barrier 46 is provided with a leg 50 corresponding to leg 30 and a leg 52 corresponding to leg 32. A lip 48 is provided corresponding to lip 36.

Moisture barrier 46 does not have a leg corresponding to leg 34. The inner surface of leg 50 or 52 may be adhesively secured to the layer 24 of dry wall sheathing to facilitate handling of the same as a unit. The outer surface of legs 50 and 52 may be provided with peaks and valleys 54 and 56, respectively, as described above in connection with moisture barrier 28. It will be noted that the terminal end of leg 52 terminates in a peak 54 adjacent its inner surface. The last-mentioned peak is adapted to be in contact with an end face on the sheathing 16. Thus, capillary passages will be provided as described above between the juxtaposed surfaces on the dry wall sheathing and the metal frame.

Hereinafter, the peaks 38, ribs 44 or peaks 54 may be referred to as deformable projections.

The present invention may be embodied in other specific forms without departing from the spirit or essential attributes thereof and, accordingly, reference should be made to the appended claims, rather than to the foregoing specification as indicating the scope of the invention.

I claim:

1. In a wall construction comprising a framed opening including a metallic frame secured in the framed opening and a layer of dry wall sheathing having juxtaposed surfaces at right angles to each other, an extruded strip-like section moisture barrier between said juxtaposed surfaces, said barrier having first and second legs which are substantially perpendicular to each other, said barrier being made from a water impervious polymeric material, a lip integral with the terminal portion of said first leg and overlying a portion of said metallic frame, said legs having inner surfaces juxtaposed to said dry wall sheathing and outer surfaces juxtaposed to said frame, a third leg at least as long as said first leg connected to said second leg and extending substantially parallel to said first leg whereby said moisture barrier is substantially U-shaped in cross section, said dry wall sheathing being disposed between said first and third legs, said outer surfaces on said moisture barrier having spaced substantially parallel deformable projections in contact with said frame which define a plurality of spaced substantially parallel channels through which condensate on said frame may be permitted to gravitate, with said projections extending substantially the entire length of said barrier.

2. An article of manufacture comprising an elongated extruded strip-like section moisture barrier, said moisture barrier having first and second legs which are substantially perpendicular to each other, said moisture barrier being made of a water impervious polymeric material, a lip integral with the terminal portion of said first leg and substantially parallel to said second leg, said lip being shorter than said first leg, a third leg connected to a terminal portion of said second leg and extending substantially parallel to said first leg, said third leg being at least as long as said first leg, said lip extending in a direction substantially perpendicular to said third leg, said lip and said second leg extending in opposite directions from said first leg, said legs having inner and outer surfaces with the inner surfaces being between said first and third legs, and substantially parallel deformable projections on the outer surfaces of said first, second and third legs and extending for substantially the entire length thereof.

References Cited by the Examiner

UNITED STATES PATENTS

| | | | |
|---|---|---|---|
| 2,303,864 | 12/1942 | Reasor | 52—117 |
| 2,840,869 | 7/1958 | Fegan | 52—208 |
| 2,859,486 | 11/1958 | Rovich | 20—70 X |
| 3,023,464 | 3/1962 | Zerbe | 52—202 X |
| 3,139,702 | 7/1964 | Wasserman | 52—309 X |

HARRISON R. MOSELY, *Primary Examiner.*

K. DOWNEY, *Assistant Examiner.*